Sept. 23, 1969    R. L. LAUGEL    3,468,424
STRAIGHT-LINE FILTER WITH WATER BOX
Filed March 7, 1968
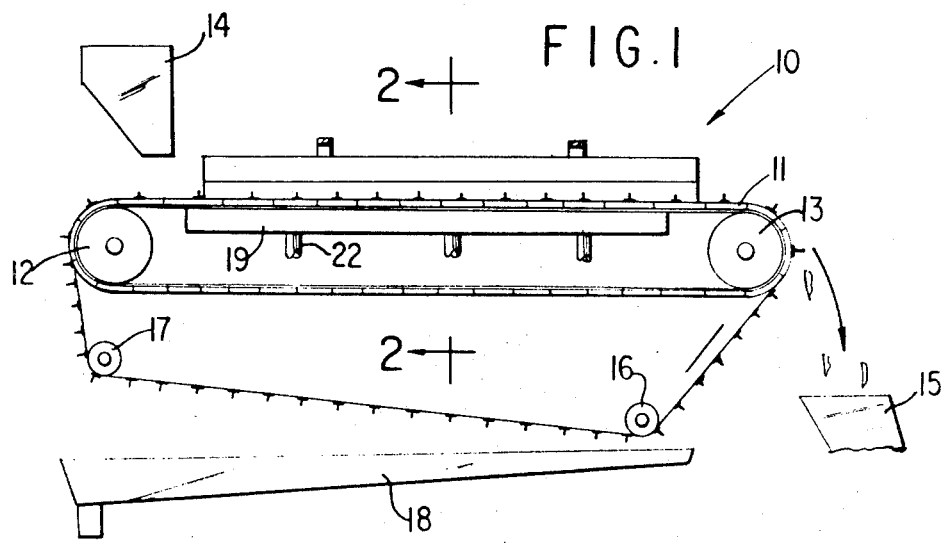
FIG.1
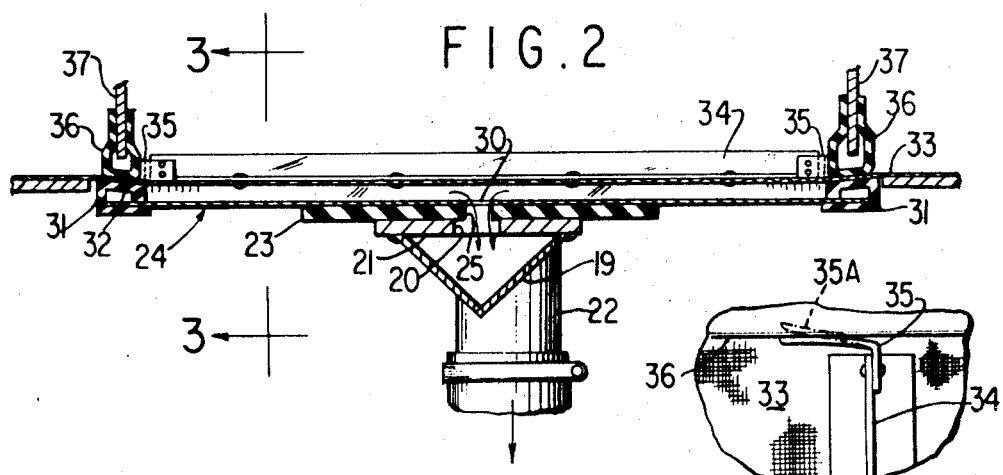
FIG.2
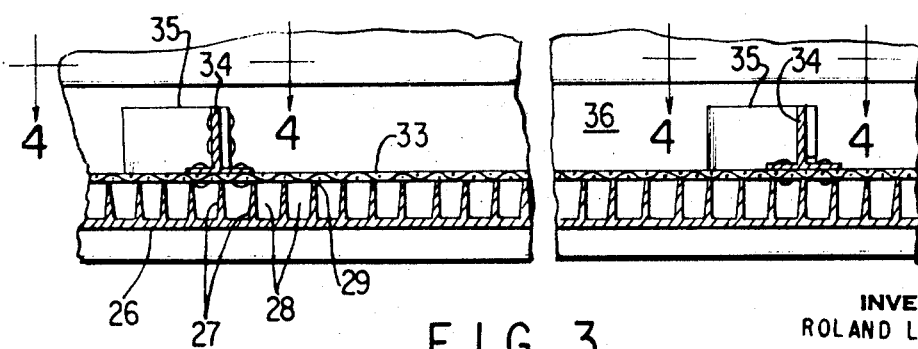
FIG.3
FIG.4
INVENTOR
ROLAND L. LAUGEL
BY
Smythe & Moore
ATTORNEYS United States Patent Office 3,468,424
Patented Sept. 23, 1969

3,468,424
STRAIGHT-LINE FILTER WITH WATER BOX
Roland L. Laugel, Moline, Ill., assignor to Ametek, Inc., New York, N.Y., a corporation of Delaware
Filed Mar. 7, 1968, Ser. No. 711,351
Int. Cl. B01d 33/04
U.S. Cl. 210—401      6 Claims

ABSTRACT OF THE DISCLOSURE

A horizontal endless belt filter arrangement having a grid means with a filter medium carried on the grid means. Transverse barriers are mounted on the filter medium with the ends of the barriers having resilient seals to engage stationary longitudinally extending sealing strips so that a plurality of pans are formed on the filter medium.

---

The present invention relates to a drainage belt assembly for a straight-line filter and particularly to one having pans formed on the filter medium as the filter medium moves past stationary longitudinal sealing strips.

A straight-line filter apparatus generally comprises a frame having a pair of spaced drums mounted thereon with an endless drainage belt mounted on the drums. The belt may be provided with a plurality of transverse ribs to define a grid so that the belt will function as a drainage belt. A filter medium is positioned on top of the drainage belt. Many different arrangements have been proposed for confining the slurry to be filtered within the boundaries of the filter medium and the drainage belt. It has been proposed to mount a plurality of pans on the drainage belt with the bottom of the pans being provided with a filter medium. As the drainage belt passes over the discharge drum, the filter cakes formed in the pans are loosened and will fall from the pans under the action of gravity. Various other structures have been used for the purpose but many of these have been unduly complex in structure or have required an excessive maintenance in order to function properly.

One of the objects of the present invention is to provide an improved drainage belt assembly for a straight line filter machine.

Another of the objects of the invention is to provide an improved pan structure to be carried by a drainage belt for a straight-line filter machine.

In one aspect of the invention, there may be provided a drainage belt assembly comprising an endless flexible belt having inner and outer surfaces with a plurality of drainage openings therein. A plurality of transversely extending ribs are mounted on the outer surface of the flexible belt and transverse strips are carried along the outer ends of the ribs to close the spaces therebetween. A flexible filter medium is carried on the tops of the transverse ribs and a plurality of transverse barriers are mounted on the filter medium. A pair of longitudinally extending flexible sealing ribs are disposed adjacent the outer ends of the transverse barriers and in contact with the filter medium. The ends of the barriers are provided with sealing means which are engageable with the longitudinally extending sealing strips whereby a plurality of pans are formed on the filter medium.

Other objects, advantages and features of the present invention will become apparent from the following specification and drawings, which are exemplary.

In the drawings:

FIG. 1 is a side elevational view of a straight-line filter apparatus provided with the drainage belt assembly according to the present invention;

FIG. 2 is an enlarged view taken along the line 2—2 of FIG. 1;

FIG. 3 is a sectional view taken along the line 3—3 of FIG. 2; and

FIG. 4 is a sectional view taken along the line 4—4 of FIG. 3 showing a plan view of the sealing means carried by the barriers on the filter medium.

Referring next to the drawings wherein like reference symbols indicate the same parts throughout the various views, a specific embodiment of the present invention will be described in detail.

FIG. 1 illustrates the straight-line filter apparatus indicated generally at 10 and comprising an endless drainage belt assembly 11 supported on end drums 12 and 13 rotatably mounted on the frame of the machine.

A feed hopper 14 is positioned above the feed end of the machine represented by drum 12, the hopper discharging a slurry which is to be filtered upon the upper travelling portion of the filter belt assembly adjacent the feed. The discharge end of the machine is at drum 13, a hopper 15 being provided underneath the drum to receive the discharged filter cake.

The lower portion of the filter belt assembly travels over idler rollers 16 and 17. One of the drums 12 and 13 may be drivingly connected to a suitable source of power (not shown). One of the idlers may be a tensioning idler controlled by a pneumatic cylinder or the like to maintain proper and even tension across the filter belt assembly, an example of such being illustrated in copending application Ser. No. 655,161, filed July 21, 1967. The lower portion of the filter belt assembly between idlers 16 and 17 travels over a pan 18 which collects wash water used to clean this portion of the filter belt assembly and which is discharged upon the belt by suitable spray assemblies (not shown).

A suction box 19 is mounted in the frame of the filter under the upper travelling portion of the filter belt assembly and has a triangular cross section as shown in FIG. 2. The suction box may be provided with a plurality of longitudinally aligned compartments with each compartment having a longitudinal slot 20 in the top wall 21 thereof for communication with drainage slots in the tracking belt which will be presently described. Connections 22 may be used to admit a liquid to the belt seal surface for lubrication thereof.

The filter belt assembly 11 comprises a tracking belt 23 and a drainage belt assembly indicated generally at 24. The tracking belt 23 is of the transmission type and may be made of rubber, leather or the like and if desired reinforced with fabric or steel wiring in a manner known in the art. The tracking belt 23 is relatively long with respect to its width and is provided with a plurality of longitudinally spaced drainage slots 25 along its central longitudinal axis (FIG. 2) arranged to communicate with drainage slots 20 in the suction box. The flexible tracking belt may also be provided with a plurality of transverse drainage slots which extend to the outer edges thereof.

The drainage belt assembly 24 comprises a flat flexible bottom portion 26 and a plurality of uniformly spaced transversely extending ribs 27 upstanding from the top surface thereof. The ribs extend across the entire width of the bottom portion 26 and define a plurality of grooves 28. The walls of each rib may taper slightly inwardly toward an apex 29, drainage slot 30 is provided along the central longitudinal axis of the bottom portion 26.

The ends of the spaces 28 between the transverse ribs are closed by positioning continuous U-shaped strips or clips 31 (FIG. 2) over the edges of the bottom portion. The upper leg of each U-shaped strip has an internal flange 32 which engages the upper surface of bottom portion 26 and also contacts the ends of the ribs 27. The strips 31 not only close the longitudinal openings between the ribs but also upturn the edge portions of the filter medium, as may be seen in FIG. 2, during its upper travel to assist in retaining slurry deposited thereon.

An endless flexible filter medium 33 is positioned upon the apices 29 of the transverse ribs and may comprise a filter medium, such as foraminous wire of metal, cloth, plastic composition, or the like. On the upper or outer surface of the filter medium 33, there are mounted a plurality of transverse barriers 34 as may be seen in FIGS. 2 and 3. Depending upon the material of the filter medium, the barriers may be secured thereto by rivets or other suitable fastening means.

Attached to the outer ends of the transverse barriers are flexible or resilient sealing strips 35 which sealingly engage respective longitudinally extending flexible strips 36. The strips 36 are substantially U-shaped in cross section and may be fitted over members 37 which are secured to the frame of the filter machine. The strips 36 are positioned in vertical alignment with the U-shaped strips 31 and engage the upper surface of the filter medium 33 as may be seen in FIG. 2. The resiliency of sealing strips 35 will be apparent from FIG. 4 where the dotted lines indicate position 35A of the sealing strips when not in engagement with longitudinal strips 36. The strips 36 are stationary with respect to the moving drainage belt but the sealing strips 35 carried by the transverse barriers provide an effective seal therewith. In effect, the transverse barriers together with the stationary strips 36 form a plurality of pans on the filter medium.

The slurry to be filtered is deposited upon the filter medium 33 and is effectively retained between the confines of the pan barriers and the longitudinal sealing strips. As the slurry is conveyed on the moving filter belt assembly, filtrate will be drawn from the slurry under the action of the suction from suction box 19. The filtrate drawn into the suction box may be discharged through the drains 22. As the slurry reaches the end of its horizontal path at the drum 13, substantially all of the filtrate will have been removed and the slurry will be in cake form between the transverse barriers. The filter cake is then discharged from the end of the drum 13 into the hopper 8 as the filter medium is bent around the drum. If so desired, means may be provided for freeing or loosening the filter cake from the filter medium prior to the arrival of the filter cake at the discharge drum 13.

It will be apparent that the present invention has provided an improved arrangement for forming pans on the filter medium of a filter belt assembly. Since the bottom surfaces of the pans are formed by the filter medium these surfaces will be bent as the filter medium passes over discharge drum 13. Bending of these pans will assist in freeing the filter cakes from the filter medium. The longitudinal edges of the pans are effectively sealed so that the slurry will be confined to the filter medium.

It will be understood that various details of construction and arrangements of parts can be changed without departing from the spirit of the invention, except as defined in the appended claims.

What is claimed is:

1. In a drainage belt assembly for a straight-line filter apparatus, the combination of an endless flexible belt having outer and inner surfaces and a plurality of drainage openings therein, a plurality of transversely extending ribs on the outer surface of said flexible belt to define a grid, a first pair of flexible strips along the outer ends of said ribs to close the spaces therebetween, a flexible filter medium carried on the tops of said transverse ribs, a plurality of transverse barriers mounted on said filter medium, a second pair of longitudinally extending flexible sealing strips along the outer ends of said transverse barriers and contacting said filter medium, and sealing means on the ends of said barriers and engageable with said second pair of sealing strips whereby a plurality of pans are formed on the filter medium to receive the slurry to be filtered.

2. In a drainage belt assembly as in claim 1 with said second pair of flexible sealing strips contacting said filter medium above said first pair of sealing strips.

3. In a drainage belt assembly as in claim 1 with said barrier sealing means comprising resilient strips attached to the barriers and brushing said second pair of flexible strips.

4. In a drainage belt assembly as in claim 1 with said second pair of flexible sealing strips being U-shaped in cross sections.

5. In a drainage belt assembly as in claim 1 with said second pair of flexible sealing strips being stationary with said barriers and sealing means thereon moving with respect thereto.

6. In a drainage belt assembly as in claim 1 with the height of said second pair of sealing strips being substantially equal to the height of said transverse barriers thereby forming pans.

References Cited

UNITED STATES PATENTS

| | | | |
|---|---|---|---|
| 2,377,252 | 5/1945 | Lehrecke | 210—401 |
| 3,190,451 | 6/1965 | Holland | 210—401 X |
| 3,372,811 | 3/1968 | Arnold et al. | 210—401 X |

REUBEN FRIEDMAN, Primary Examiner

T. A. GRANGER, Assistant Examiner